United States Patent
Kim et al.

(10) Patent No.: US 6,370,138 B1
(45) Date of Patent: Apr. 9, 2002

(54) ATM SWITCH INTERFACE APPARATUS FOR FRAME RELAY NETWORK INTERWORKING

(75) Inventors: Do Yeon Kim; Won Sik Park; Jung Sik Kim, all of Daejeon (KR)

(73) Assignees: Electronics and Telecommunications Research Institute, Daejeon; Korea Telecom, Seoul, both of (KR)

( * ) Notice: Subject to any disclaimer, the term of this patent is extended or adjusted under 35 U.S.C. 154(b) by 0 days.

(21) Appl. No.: 09/126,503

(22) Filed: Jul. 30, 1998

(30) Foreign Application Priority Data

Dec. 17, 1997 (KR) ............................................. 97-69525

(51) Int. Cl.[7] .......................... H04L 12/28; H04L 12/66
(52) U.S. Cl. ....................................... 370/353; 370/395
(58) Field of Search ................................. 370/353, 358, 370/394, 395, 396, 397, 389, 354, 232, 233, 234

(56) References Cited

U.S. PATENT DOCUMENTS

| | | | |
|---|---|---|---|
| 5,315,588 A | | 5/1994 | Kajiwara et al. ........... 370/60.1 |
| 5,737,314 A | * | 4/1998 | Hatono et al. .............. 370/235 |
| 6,118,759 A | * | 9/2000 | Ohyoshi et al. ............ 370/229 |
| 6,137,798 A | * | 10/2000 | Nishihara et al. ........... 370/392 |

* cited by examiner

Primary Examiner—Kwang B. Yao
Assistant Examiner—Brenda Pham
(74) Attorney, Agent, or Firm—Cohen, Pontani, Lieberman & Pavane (57) ABSTRACT

The user cell is received from the FRIA (Frame Relay Interface Apparatus) for thereby performing a connection identifier-based usage parameter control function, and the user cell which follows the permitted traffic and the IPC cell received from the FRIA through the IPC bus are multiplexed and synchronized to the module clock of the clock generator. The thusly synchronized user cell and IPC cell are transmitted to the ATM switch which is away by a few meters. The head data of the ATM cell received from the ATM switch is analyzed. In the case of the user cell, the frame relay interface apparatus identifier is analyzed, and the cell is transmitted to a corresponding FRIA in accordance with a corresponding virtual path identifier and virtual channel identifier value, and in the case of the IPC cell and OAM cell, the processor processes the cell using the AAL5 reassembling unit, so that it is possible to provide a cell transmission function between the frame relay interface apparatus and the ATM switching system.

5 Claims, 6 Drawing Sheets

| Bit No. | 7 | 6 | 5 | 4 | 3 | 2 | 1 | 0 |
|---|---|---|---|---|---|---|---|---|
| 1 | X | X | X | X | X | X | F13 | F12 |
| 2 | F11 | F10 | L11 | L10 | X | S14 | S13 | S12 |
| 3 | S11 | S10 | DL9 | DL8 | DL7 | DL6 | DL5 | DL4 |
| 4 | DL3 | DL2 | DL1 | DL0 | PTI | | | CLP |
| 5 | HEC | | | | | | | |
| | Payload 0 | | | | | | | |
| | Payload n | | | | | | | |
| 53 | Payload 48 | | | | | | | |

F13~F10 : FRIA(0 to 15)
L11~L10 : Link Identifier(0 to 3)
S14~S10 : Subscriber Identifier(0 to 30)
DL9~DL0 : DLCI(0 to 1023)
X : Not used

FIG. 4

| | 15 | 14 | 13 | 12 | | 8 | 7 | 6 | | 0 |
|---|---|---|---|---|---|---|---|---|---|---|
| +0 | I | MF | FF | Command result | | | S | Command | | |
| +2 | all 0 | | | | | | I | I | FRIA[3..0],LI[1..0] | |
| +4 | I | SI[4...0], DLCI[9..8] | | | | | DLCI[7...0] | | | |
| +6 | Reserved | | | Connection ID | | | | | | M |
| +8 | Reserved | | | | | | | | | |
| +A | Reserved | | | | | | | | | |

I : CAM Initialization Flag     MF : Match Flag for Processor
FF : Full Flag for Processor     LI : Link Identifier(0~3)
SI : Subscriber Identifier(1~31)

M : Match Flag

FIG. 5

| | 7 | 6 | 5 | 4 | 3 | 2 | 1 | 0 |
|---|---|---|---|---|---|---|---|---|
| 1 | X | X | X | X | X | X | X | VP4 |
| 2 | VP3 | VP2 | VP1 | VP0 | X | X | X | X |
| 3 | CI11 | CI10 | CI9 | CI8 | CI7 | CI6 | CI5 | CI4 |
| 4 | CI3 | CI2 | CI1 | CI0 | PTI | | | CLP |
| 5 | HEC | | | | | | | |
| | Payload 0 | | | | | | | |
| | Payload n | | | | | | | |
| 53 | Payload 48 | | | | | | | |

VP4-VP0 : Virtual Path Identifier (0 to 31)
CI11-CI0 : Connection Identifier (0 to 4095)
X : Not used

FIG. 6

| Bit No. | 15          8 | 7          0 |
|---|---|---|
| Address = Connection ID X 4   0 | Reserved | Routing Information 0 |
| 1 | Routing Information 1 | Routing Information 2 |
| 2 | Reserved | Outgoing VPI |
| 3 | Outgoing VCI ||
| 4 | Reserved | Routing Information 0 |
| 5 | Routing Information 1 | Routing Information 2 |
| 6 | Reserved | Outgoing VPI |
| 7 | Outgoing VPI ||
| 8    ...    16.383 | | |

FIG. 7

|   | 7 | 6 | 5 | 4 | 3 | 2 | 1 | 0 |
|---|---|---|---|---|---|---|---|---|
| RT0 | IDL | MTC | \multicolumn{6}{c|}{ASW_ORG} |

| | | |
|---|---|---|
| RT0 | IDL \| MTC | ASW_ORG |
| RT1 | CDP | CSW |
| RT2 | CET | ASW_DES |
| HD0 | GFC/VPI | VPI |
| HD1 | VPI | VCI |
| HD2 | VCI | |
| HD3 | VCI | PTI \| CLP |
| FD4 | EHEC | |
| 8 Ots | ATM Link Control Field | |
| | Information Field 48 octets | |

ATM SWITCH INTERFACE APPARATUS FOR FRAME RELAY NETWORK INTERWORKING

BACKGROUND OF THE INVENTION

1. Field of the Invention

The present invention relates to an ATM(Asynchrnous Transfer Mode) switch interface apparatus for frame relay interworking, and in particular, to an improved ATM switch interface apparatus for frame relay interworking which is capable of receiving a user cell from a FRIA (Frame Relay Interface Apparatus), performing a connection identifier-based usage parameter control function, transmitting the IPC cell received from the FRIA through a IPC bus and a user cell in which a traffic is valid to an ATM switch by synchronizing a module clock received from a clock generator, analyzing the head data of the ATM cell received from the ATM switch when the data corresponds to a user cell, transmitting the cell to a corresponding FRIA based on a corresponding virtual path identifier and a virtual channel identifier value and allowing a processor to process the cell using an AAL5 reassembly in the case of an IPC (Inter Processor Communication) cell and an OAM (Operation and Maintenance) cell.

2. Description of the Prior Art

At an initial stage of the ATM service, a high speed data communication service such as a frame relay, a SMDS (Switched Multi-megabit Data Service), a circuit emulation, etc. will be available. The frame relay, SMDS, and leased line service may be provided using an independent network which is built by the type of each service. In view of the operator of the network, the ATM backbone network is implemented for the purpose that all existing services and future services may be available as one integrated service network. Therefore, for the ATM switching system, the frame relay interworking apparatus is developed for the existing services such as the service implemented based on the ATM, the existing frame relay service, etc.

In addition, the B-ISDN (Broadband-Integrated Service Digital Network) has an advantages in that it is possible to provide various services using an effective network resource. Therefore, in the industry, an ATM network and an ATM switch have been developed for implementing a high speed broadband communication such as a high speed data transmission, a video communication, etc. However, since the ATM network is able to provide a frame relay service, there is a disadvantage in that an ATM switch interface function is needed, in which the data of the frame unit is converted into an ATM cell and interfaced with the ATM switch.

SUMMARY OF THE INVENTION

Accordingly, it is an object of the present invention to provide an ATM switch interface apparatus for frame relay interworking which overcomes the aforementioned problems encountered in the conventional art.

It is another object of the present invention to provide an ATM switch interface apparatus for frame relay interworking which is capable of receiving a user cell from a FRIA (Frame Relay Interface Apparatus), performing a connection identifier-based usage parameter control function, transmitting a user cell in which a traffic is valid and the IPC cell received from the FRIA through a IPC bus to an ATM switch by synchronizing a module clock received from a clock generator, analyzing the head data of the ATM cell received from the ATM switch when the data corresponds to a user cell, transmitting the cell to a corresponding FRIA based on a corresponding virtual path identifier and a virtual channel identifier value and allowing a processor to process the cell using an AAL5 reassembly in the case of an IPC (Inter Processor Communication) cell and an OAM (Operation and Maintenance) cell.

In order to achieve the above objects, there is provided an ATM switch interface apparatus for frame relay interworking which includes an up stream cell flow interface which consists of an up stream cell transmission request signal, a FIFO read enable signal, a read clock signal, and a 16 bit data bus; a buffer for decreasing an effect of an external noise with respect to a cell inputted through the up stream cell flow interface; a cell bus receiving controller (CBRC) including a data register for storing the cell inputted through the buffer and a control register in order for a processor to perform a registration, deletion and enquiry of a connection, performing a up stream cell transmission request signal checking operation, a FIFO read enable signal generating function, a content address memory (CAM) and a usage parameter control FIFO (UPC FIFO); a UPC for checking a user cell traffic with respect to the cell stored in the UPC FIFO and UPC memories for storing a control data and a statistic data; a user cell for storing a user cell passed through the UPC; an IPC cell transmitting FIFO for storing an IPC cell and an OAM cell that the processor transmits to the ATM switch; a control signal generator for controlling an ALL5 cell segmentation for storing the IPC cell and OAM cell into the ITFIFO and generating a chip selection signal of a 4 Mbyte data memory; a buffer for receiving an FRIA state management message inputted via the IPC bus and controlling a data bus; a processor for processing a state management message inputted from the buffer and storing the cell transmitted to the ATM switch into the SPM memory and controlling the entire operation; an AAL5 cell segmentation, packet memories of a 128 Kbyte, and control memories of 128 Kbyte; a cell multiplexer for reading the cell stored in the FIFO when more than one cell from the UFIFO and ITFIFO is stored, performing a head conversion using a connection identifier of the cell head, generating an HEC with respect to a head 7 byte, creating an odd parity bit and transmitting the cell to the link interface unit in synchronization with a 23.4747 MHz clock signal; a cell head conversion table (HCT) including a 32 Kbyte DPRAM for storing a head conversion table transmitted from the processor so that the cell multiplexer performs a head conversion; a switch link transmitting and receiving unit for converting an odd parity generation and checking data, a head error control (HEC) generation and checking data and a parallel data with respect to the cell inputted from the cell multiplexer (MUX) into a serial data, transmitting the thusly converted data to the LLIA of the ATM switch through a ground-shielded cable, converting the serial data received from the LLIA into a parallel data, generating an odd parity bit and transmitting to the cell demultiplexer; a cell demultiplexer for receiving the cell from the LTRI, identifying a user cell and an IPC cell, transmitting the user cell to the FRIA or the IPC cell and the OAM cell to the IRFIFO; an AAL5 reassembling unit for reassembling the cell stored in the IRFIFO in the form of the AAL5, 128 Kbyte packet memories, and 128 Kbyte control memories; a buffer for controlling a 16 bit data bus transmitted from the cell demultiplexer; and a clock receiver for receiving a clock of an ECL level from the FCDA interface and providing the thusly received clock to the LTRI, CBRC and MUX, respectively.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
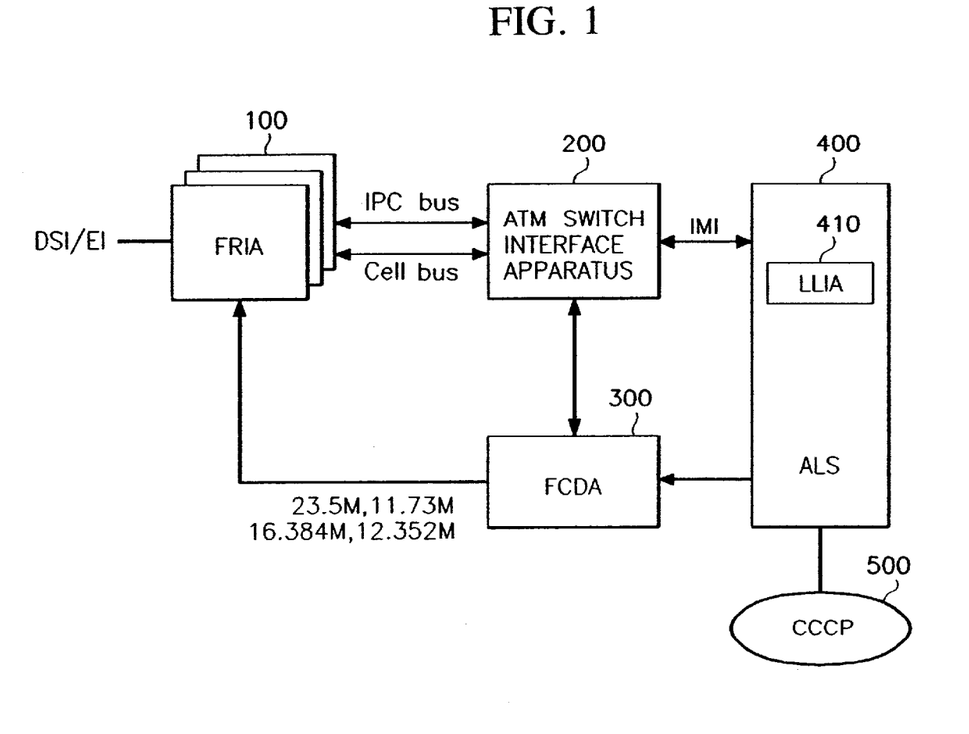
FIG. 1 is a block diagram illustrating a frame relay interworking system according to the present invention.

FIG. 1 is a block diagram illustrating a frame relay interworking system according to the present invention. As shown therein, the frame relay interworking system according to the present invention includes 16 frame relay interface apparatuses (FRIA) 100 for performing a channelized/unchannelized 4 DSI/E1 interface, Q.922 core function, a frame-to-ATM cell conversion function, a network management hierarchy protocol process, an OAM and PVC state management function, and a frame relay/ATM interworking core function, a frame relay clock signal distribution apparatus (FCDA) 300 for receiving a system clock from the ATM switch (ALS: Local Switch) 400 and generating a clock signal which is used for an ATM switch interface apparatus and a frame relay interface apparatus, an ATM switch interface apparatus 200 for performing the transmission of an IPC cell, an OAM cell and a user cell, a UPC function, and an ATM switch interface function, a local link interface apparatus (LLIA) 410 for providing a link interface function between ATM switches, and a call connection control processor 500 for performing a call processing function.

Figure 2:
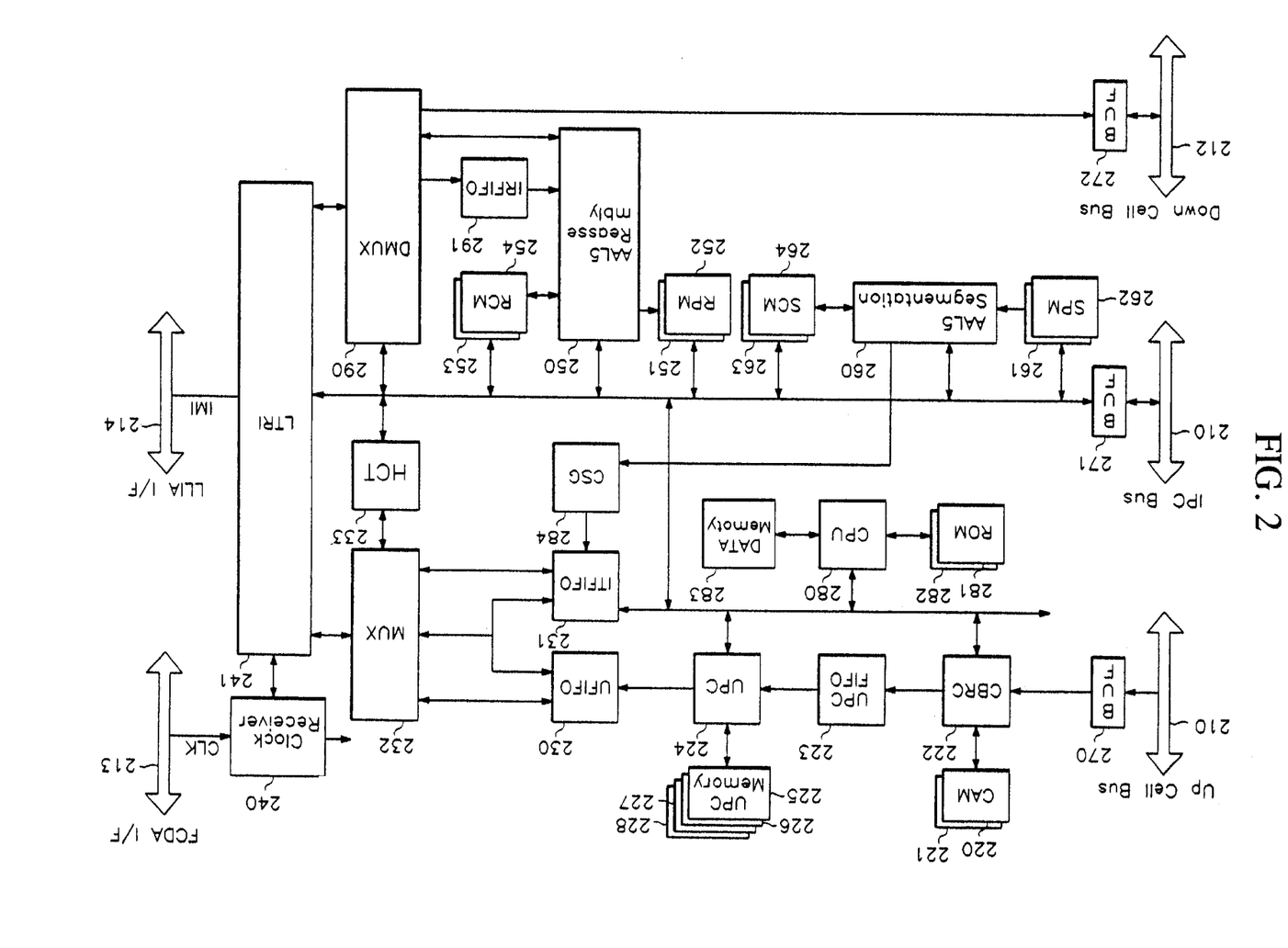
FIG. 2 is a block diagram illustrating an ATM switch interface apparatus for frame relay interworking.

FIG. 2 is a block diagram illustrating an ATM switch interface apparatus for frame relay interworking. As shown therein, the ATM switch interface apparatus for frame relay interworking 200 includes an up stream cell bus 210, a data bus buffer 270, a cell bus receiving controller (CBRC) 222, content address memories (CAM) 220 and 221, a usage parameter control FIFO (UPC FIFO) 223, a usage parameter controller (UPC) 224, UPC memories 225 through 228, a user cell FIFO (UFIFO) 230, an IPC cell transmission FIFO (ITFIFO) 231, an ATM cell multiplexer (MUX) 232, a cell head conversion table 233, a clock receiver 240, a switch link transmitter and receiver (LTRI) 241, a cell demultiplexor (DMUX) 290, a data bus buffer 272, a down stream cell bus interface 212, an IPC cell receiving FIFO (IRFIFO) 291, an AAL5 cell reassembly unit 250, AAL5 cell reassembly unit packet memories (RPM) 251 and 252, AAL5 cell reassembly unit control memories (RCM) 253 and 254, AAL5 cell segmentation unit packet memories (SPM) 261 and 262, an AAL5 cell segmentation unit 260, AAL5 cell segmentation unit packet memories (SCM) 263 and 264, a data bus buffer, address bus buffer and control bus buffer 271, a CPU 280, program memories 281 and 282, a data memory 283 and a control signal generator (CSG) 284.

The apparatus will be explained in more detail with reference to FIG. 2.

First, the up stream cell bus 210 and the data bus buffer 270 receive a user data from the FRIA in the size of the word.

The CBRC 222 checks whether there is a cell transmission request from a predetermined apparatus of the FRIA0 through FRIA15 and the loop back cell FIFO, generates a FIFO read enable signal for a corresponding apparatus, reads a data, performs a connection point registration, deletion and enquiry received from the processor, constitutes a UPC cell. In addition, the CAM 220 and 221 receives a command concerning a connection point registration, deletion and enquiry from the CBRC 222 and provides maximum 4096 connection point. The UPC FIFO 223 stores the cell for checking whether a usage parameter is used with respect to the cell received.

In addition, the UPC 224 and the UPC memories 225 through 228 checks whether a negotiated traffic parameter with respect to the cell inputted is used. The UFIFO 230 stores the user cell passed the UPC 224. The ITFIFO 231 stores the IPC cell transmitted to the ATM switch. The MUX 232 synchronizes the cell stored in the UFIFO and ITFIFO to a 23.474 MHz and transmits to the ATM switch. The cell head conversion table 233 performs an input/output VPI/VCI (virtual path identifier/virtual.channel identifier) conversion. The clock receiver 240 receives a clock from the FCDA interface and outputs to the circuit of the apparatus. The LTRI 241 transmits or receives a user cell and IPC cell to/from the LLIA interface. The DMUX 290 identifies the user cell, IPC cell and OAM cell from the cell received.

In addition, the data bus buffer 272 and the down direction cell bus interface 212 transmit the cell to corresponding FRIA in the case of the user cell. The IRFIFO 291 stores the IPC cell and OAM cell. The AAL5 reassembly 250 reassemblies the cell in the type of the AAL5. The RPM 251 and 252 store the reassembled cell. The RCM 253 and 254 stores a control information for reassembling the cell. The SPM 261 and 262 store the data that the processor transmits to the ATM switch. The AAL5 cell segmentation unit 260 segments the data stored in the SPM to ATM cells. The SCM 263 and 264 store a control information for segmenting the data into the ATM cell. The data bus, address bus buffer and control bus buffer 271 is connected with the FRIA and VME bus for transmitting and receiving the state management information. The CPU 280 transmits the IPC cell to the ATM switch call processing processor, transmits a state management information between the FRIAs through the VME bus and controls various function units of the ATM switch interface apparatus. The CSG 284 controls the data bus buffer of the cell reassembly and segmentation unit and generates a chip selection signal of the data memory and a chip selection signal for controlling the internal register of the apparatus. In addition, there are further provided program memories 281 and 282 and a data memory 283.

The operation of the present invention will be explained with reference to the accompanying drawings.

First, the CBRC 222 periodically checks the cell transmission request signal inputted from the FRIA0 through FRIA15 (100) through the up stream cell bus 210. The checking operation is performed in such a manner that the side of the lower FRIA number is first selected when more than two FRIAs request a cell transmission. When the cell transmission request is recognized, a read enable signal is generated in the FIFO of the FRIA and is synchronized with a up stream cell bus clock of 11.73735 Mhz, so that 56 octet is read and stored in the internal register of the CBRC 222. The interface of the up stream cell bus is similar with the UTOPIA (Universal Test and Operations Physical Interface for ATM) interface, and the user cell formation transmitted from the FRIA is shown in FIG. 3.

Figure 3:
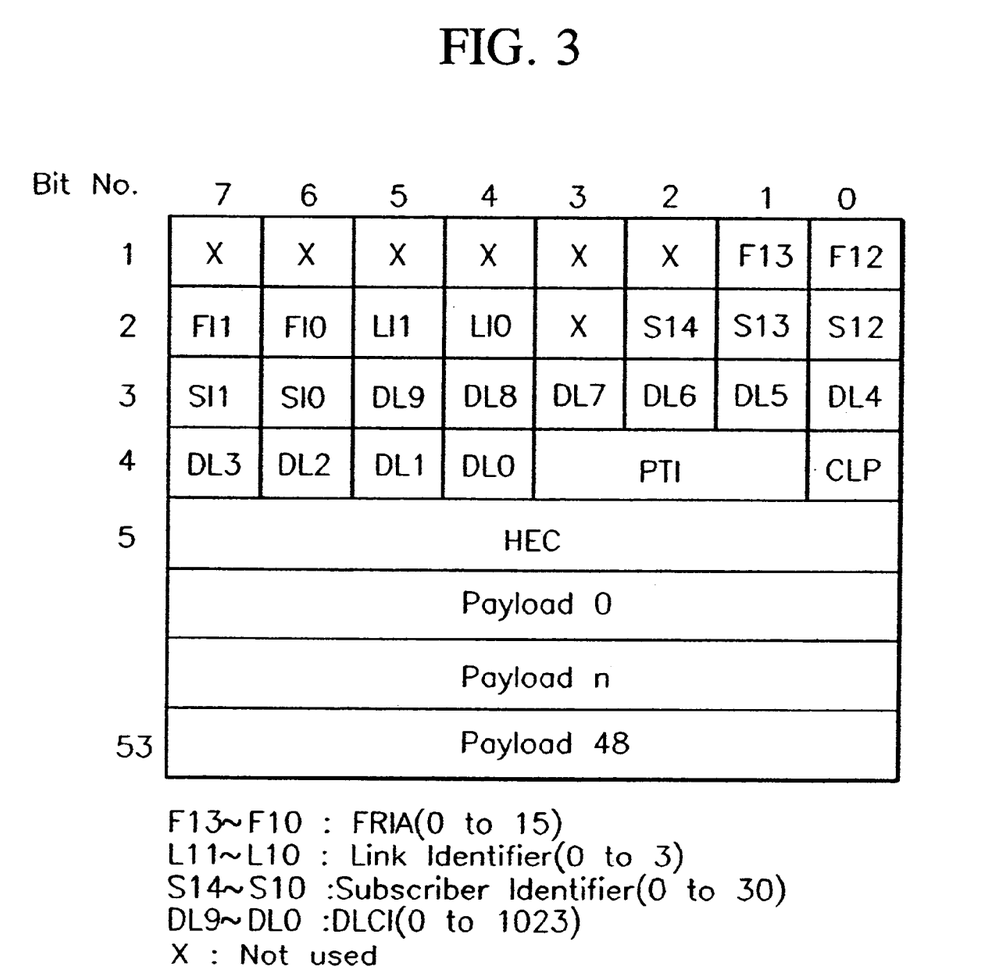
FIG. 3 is a view illustrating an up stream ATM cell format according to the present invention.
Figure 4:
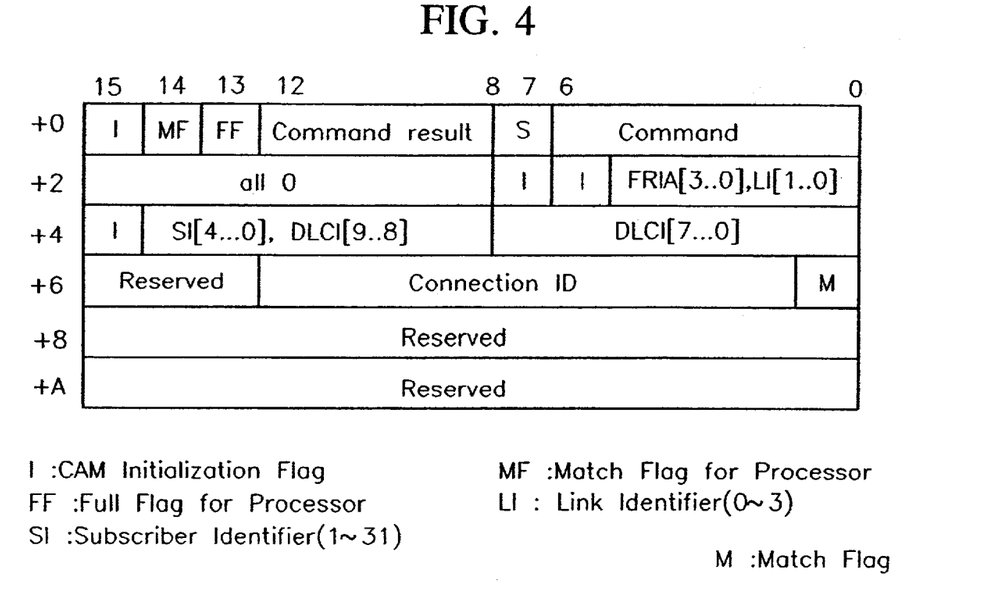
FIG. 4 is a view illustrating a CAM control register format according to the present invention.

As shown in FIG. 3, the head of the cell includes a FRIA number, a link number, a subscriber number, and a DLCI (Data Link Connection Identifier) value, each having 20 bit size and varying at every call setup. At this time, when setting the connection points in the look-up table method using the total size of 20 bits, a large capacity of memories is needed, so that the processing time is delayed. Since a proper connection point as much as the input traffic capacity is generated using the CAM 220 and 221, the head information of the cell inputted is converted based on the connection point identifier and then processed and managed. The CAM 220 and 221 register, delete and enquires 4096 connection identifiers. The connection identifier is transferred from the CCCP 500, and the processor performs a connection identifier registration, deletion and enquiry using the CAM control register. The format of the CAM control register is shown in FIG. 4 and is supplied from the CBRC 222. At this time, the processor 280 performs a connection identifier registration and deletion transmitted from the CCCP 500 using the CAM control register transferred from the CBRC, and the up stream cell inputted through the up stream cell flow interface obtains a connection identifier within 600 nano seconds based on the hardware logic.

When the processor registers the connection identifier, the FRIA number, link number, subscriber number and DLCI are inputted into the control register, and the command bit is registered as "1", and when S bit is 0, the command result bit is verified, and when the command result is OK, the connection identifier registered in the CAM is managed and enquired. In the up stream user cell stored in the CBRC register, the FRIA number, link number, subscriber number and DLCI value shown in FIG. 3 are inputted into the CAM by the hardware logic. The CAM enquiries the registered connection identifier. If registered, a match flag which represents that the connection identifier is valid is outputted. The CBRC converts the format into the cell format (shown in FIG. 5) using the connection identifier.

Figure 5:
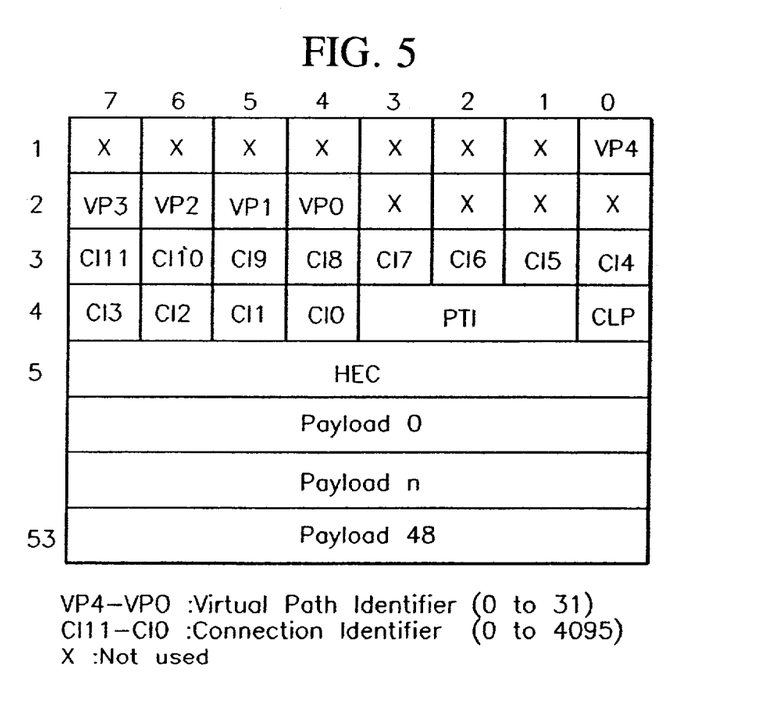
FIG. 5 is a view illustrating an ATM cell format stored in a usage parameter control (UPC) FIFO according to the present invention.

The cell format shown in FIG. 5 stores the connection identifier into a VCI field for checking whether the ATM cell format is identical but the user cell traffic parameter is used. The CBRC stores the cell into the UPC FIFO 223 for transmitting the cell having the format shown in FIG. 5 to the UPC. The UPC 224 accesses the cell stored in the UPC FIFO 223 using the UTOPIA interface for thereby checking whether the negotiated traffic parameter is used. The cell in which the CLP (Cell Loss Priority) is 1 is tagged with respect to the violated cell or the cell is not used. The UPC 224 counts the entire cells, the cells in which CLP is 0, and the violated cells. The UPC 224 stores the cell which is used for the traffic parameter into the UFIFO 230. The MUX 232 checks whether more than one cell is periodically stored in the UFIFO 230 and the ITFIFO 231. The checking operation is performed in such a manner that the input cells are counted using the writing enable signal and writing clock written into the UFIFO 230 and the start of the cell signal. The PAFF (Programmable Almost Full Flag) supplied from the FIFO is used to check whether the cell is stored in the ITFIFO 231. If more than one cell is stored into the UFIFO 230 or the ITFIFO 231, the cell head conversion is implemented using 12 bits of the connection identifier shown in FIG. 5. The cell head conversion table consists of 32K byte DPRAM (Dual Port RAM). One port is directed to storing the routing information and cell head conversion information transferred from the CCCP, and another port is a port for accessing the head conversion information for transmitting the user cell to the ATM switch. The data format stored in the cell head conversion table is shown in FIG. 6.

Figure 6:
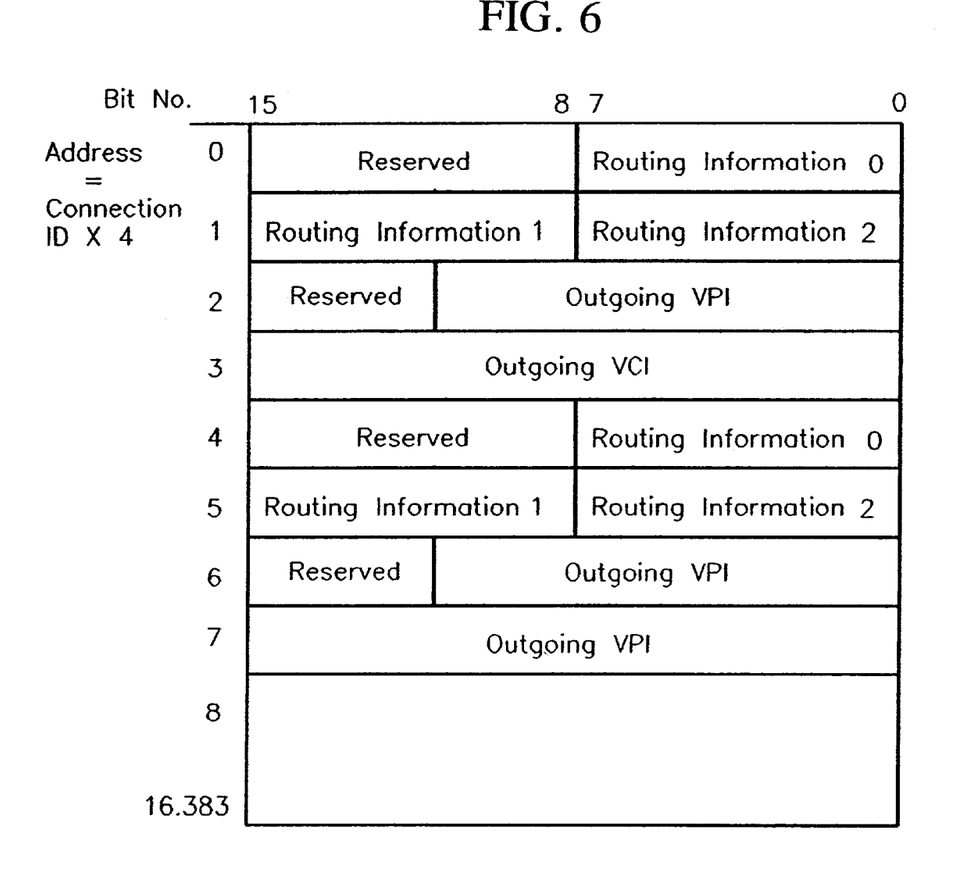
FIG. 6 is a view illustrating a cell head conversion table according to the present invention.

Four words of memory is provided for each connection identifier shown in FIG. 6, and 16,384 words of memory is needed for storing 4096 connection identifier. The MUX 232 accesses the cell head conversion table with reference to the connection identifier. The DPRAM access address is the value of "connection identifier×4." The MUX 232 forms the switching system internal cell using the IMI (Inter Module Interface) of FIG. 7 with reference to the routing information 3 bytes, the output VPI 12 bits and the output VCI 16 bits stored in the DPRAM.

Figure 7:
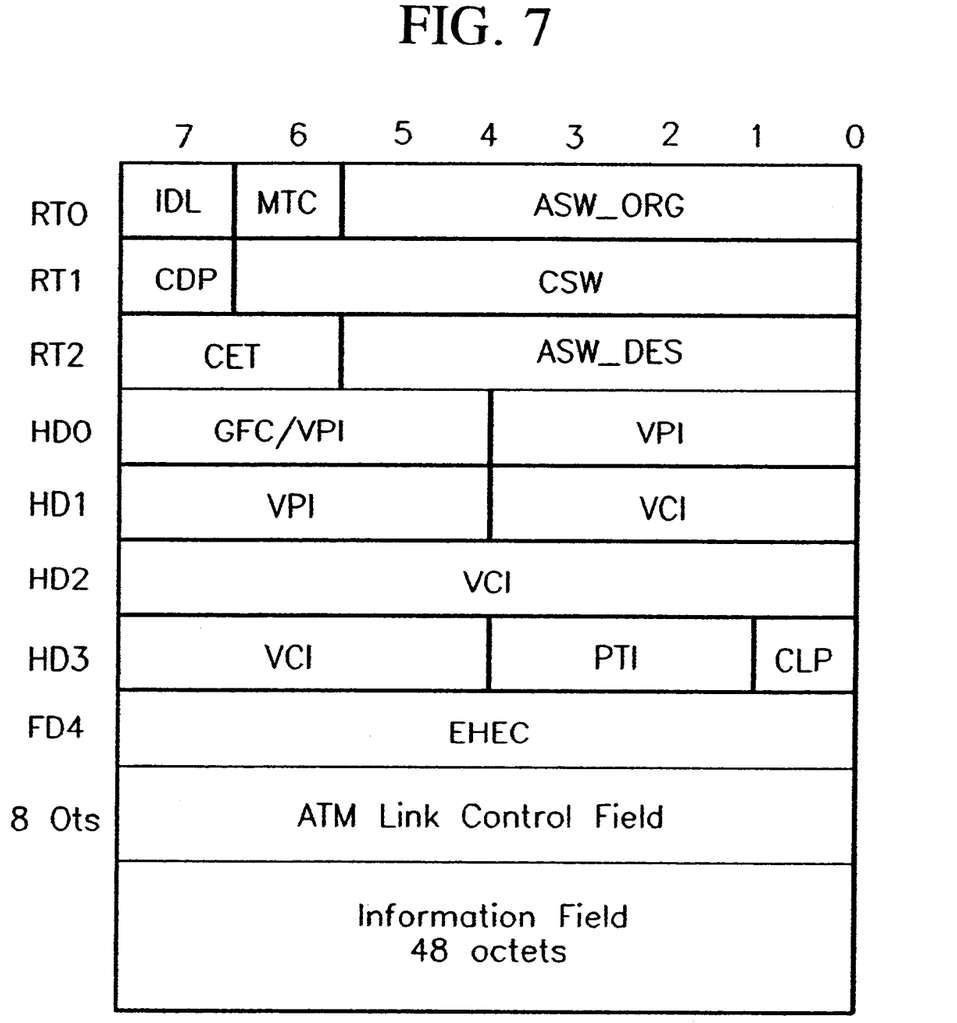
FIG. 7 is a view illustrating a switching system internal cell format according to the present invention.

As shown in FIG. 7, the idle bit represents that the cell is a valid cell or invalid cell. The MTC (Multipoint Code) bit represents a point-to-point or a point-to-multipoint, and the ASW_ORG (Access Switch Origination Address) represents a first layer switch port of a three layer switch, the CSW (Central Switch Address) represents a two layer switch port, and the ASW_DES (Access Switch Destination Address) represents a three layer switch port. The ATM link control field needs 8 bytes for the communication link control between the LTRI 241 and the LLIA. The EHEC (Extended HEC) is a head error control (HEC) byte which is expressed as $X^8+X^2+X+1$ with respect to the routing information 3 bytes and the cell head 4 bytes. The MUX 232 forms the system internal cell as shown in FIG. 7 and transmits the cell to the LTRI 241. When transmitting the cells to the LTRI 241, the odd parity bit, data 8 bit, transmitting clock signal and cell synchronous signal are transmitted thereto. The LTRI 241 recognizes that the cell is started when the MCS (Module Cell Synchronization) signal generated in the MUX 232 is transited to the low level and intercepts the data whenever the transmission clocks signal is transited to a high level. The odd parity bit is generated, and is compared whether it is the same as the received parity bit. EHEC byte is expressed as $X^8+X^2+X+1$ with respect to the bytes from the first byte to the seventh byte of the cell. Thereafter, the byte value of the HEC field of the cell is compared with the thusly generated EHEC byte for thereby transmitting a parity and head error checking result to the multiplexer. In addition, the LTRI 241 converts 8 bit parallel data into a serial differential signal of ECL level of 237 MHz. The thusly converted signal is transmitted to the LLIA 214 of the ATM switch through two physical links based on the double structure of the switch link.

In view of the receiving direction, the switching system internal cell transmitted from the LLIA 214 of the ATM switch is inputted into the LTRI 241 through two physical links for the double structure of the link, and the LTRI 241 determines whether the 8 bit parallel data loop back cell or the serial data loop back cell is received or not, and the link selection signal which represents whether a predetermined link between two physical links is selected. In addition, the LTRI(241) receives an ECL differential signal of 237 MHz, converts the received signal into 8 bit parallel data, generates an odd number parity bit with respect to the received data, and transmits the thusly generated bit to the DMUX 290 for thereby generating a receiving clock and a receiving synchronous signal which are used for the DMUX 290.

The DMUX 290 generates an odd parity bit with respect to the received data and compares the thusly generated bit with the inputted parity bit. If there is a parity bit error, the state display device is driven, and the processor is informed of the parity error. The type of the system internal cell inputted into the DMUX 290 is shown in FIG. 7. The DMUX 290 recognizes that the byte is the first byte of the cell when the received synchronous signal is transited to the low level, and the received clock is transited to the high level and stores the next bytes into the 8 bit register whenever the received clock is transited to the high level. When the first byte of the cell is inputted, the invalid cell or valid cell is identified. The invalid cell is discarded, and if the cell is a valid cell, the user cell or IPC cell is identified based on the third byte (CET: Cell Type) of the cell. In the case of the user cell, if the PTI (Payload Type ID) of the head is 100 or 101, the cell is the OAM cell. Therefore, the cell is stored into the IRFIFO. The user cell is transmitted to the FRIA 100 through the down stream bus 212, and the cell inputted into the 8 bit bus is converted into the cell of 16 bit bus, and 8 bits of the ATM link control field is removed, and the user cell of 28 words is transmitted. At this time, since the user cell designates a predetermined FRIA among the FRIA0 through FRIA15, the apparatus ID is analyzed in the VPI field, and the bit map in which one bit among 16 bits of the first word region of the user cell is set to 0 is added and transmitted. In addition, if the received cell is the IPC cell and the OAM cell, the routing information region 3 byte of the system internal cell and the ATM link control field 8 byte are removed and converted into the ATM cell of 53 bytes. At this time, since the HEC is HEC with respect to 7 bytes, the HEC is generated again with respect to the ATM cell head 4 byte and then is stored into the IRFIFO 291. The IPC cell or OAM cell stored in the IRFIFO 291 are reassembled by the AAL5 reassembling unit 250 and then are stored in the RPM 251 and 252, and the processor processes the IPC cell and OAM cell.

The clock receiver 240 receives 46.9494 MHz, 23.474 MHz and 11.73735 MHz clock from the FCDA 213 through the ground-shielded connector as an ECL level differential signal, and the thusly received signals are outputted to the LTRI 241, the MUX 232 and the CBRC IC 222, respectively.

As described above, in the present invention, the user cell is received from the FRIA (Frame Relay Interface Apparatus) for thereby performing a connection identifier-based usage parameter control function, and the user cell which follows the permitted traffic and the IPC cell received from the FRIA through the IPC bus are multiplexed and synchronized to the module clock of the clock generator. The thusly synchronized user cell and IPC cell are transmitted to the ATM switch which is away by a few meters. The head data of the ATM cell received from the ATM switch is analyzed. In the case of the user cell, the frame relay interface apparatus identifier is analyzed, and the cell is transmitted to a corresponding FRIA in accordance with a corresponding virtual path identifier and virtual channel identifier value, and in the case of the IPC cell and OAM cell, the processor processes the cell using the AAL5 reassembling unit, so that it is possible to provide a cell transmission function between the frame relay interface apparatus and the ATM switching system.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In an asynchronous transfer mode (ATM) switching system for performing a frame relay service, including an ATM local switch (ALS), an ATM switch interface apparatus, 16 frame relay interface apparatuses (FRIA) for performing a channelized/unchannelized 4 DSI/E1 interface, a Q.922 core function, a frame-to-ATM cell conversion function, a network management hierarchy protocol process, an OAM and PVC state management function, and a frame relay/ATM interworking core function, a frame relay clock distribution apparatus (FCDA) for receiving a system clock from the ALS and generating a clock used for the ATM switch interface apparatus and the FRIA, a local link interface apparatus (LLIA) for providing a link interface function between the ATM switches, and a call connection control processor (CCCP) for performing a call processing function, the improvement comprising the ATM switch interface apparatus for frame relay network interworking comprising:

an up stream cell flow interface comprising an up stream cell transmission request signal, a FIFO read enable signal, a read clock, and a 16 bit data bus;

a first buffer connected to said upstream cell flow interface for receiving a cell inputted through the up stream cell flow interface and decreasing an effect of an external noise with respect to the cell inputted through the up stream cell flow interface;

a cell bus receiving controller (CBRC) connected to a content address memory (CAM), a usage parameter control FIFO (UPC FIFO), and a processor, said CBRC including a data register for storing the cell inputted through the first buffer and a control register for enabling the processor to perform a registration, deletion and inquiry of a connection identifier, the CBRC performing an up stream cell transmission request signal checking operation and generating a FIFO read enable signal;

a UPC connected to the UPC FIFO, the processor and UPC memories for checking a user cell traffic with respect to the cell stored in the UPC FIFO and storing a control data and a statistic data in the UPC memories;

a user cell FIFO (UFIFO) connected to the UPC for storing a user cell passed through the UPC;

an IPC cell transmitting FIFO (ITFIFO) connected to the processor for storing an IPC cell and an OAM cell transmitted via the processor to the ALS;

a control signal generator connected to the ITFIFO for controlling ALL5 cell segmentation for storing the IPC cell and OAM cell into the ITFIFO and generating a chip selection signal of a 4 Mbyte data memory;

a second buffer for receiving an FRIA state management message inputted via an IPC bus and controlling a data bus;

the processor processing a state management message inputted from the second buffer and storing the IPC cell and the OAM cell transmitted to the ALS into a segmentation packet memory (SPM);

the SPM comprising 128 Kbyte and a segmentation control memory (SCM) comprising 128 Kbyte connected to the ALL5 cell segmentation;

a cell multiplexer connected to the UFIFO and ITFIFO for reading the cell stored in the UFIFO and ITFIFO, performing a cell head conversion using a connection identifier of the cell head when more than one cell from the UFIFO and ITFIFO is stored, generating a head error control (HEC) with respect to a first 7 bytes of the cell, creating an odd parity bit and transmitting the cell to the LLIA in synchronization with a 23.4747 MHz clock signal;

a cell head conversion table (HCT) connected to said cell multiplexer and including a 32 Kbyte DPRAM for storing a head conversion table transmitted from the processor, the cell multiplexer receiving the head table conversion for performing the head conversion;

a switch link transmitting and receiving unit (LTRI) connected to the cell multiplexer for receiving the cell from the multiplexer, generating an odd parity bit, and checking the odd parity bit against a received parity bit via a head error control (HEC) code generation and checking and converting a parallel data with respect to the cell inputted from the cell multiplexer into a serial data, and transmitting the thusly converted serial data to the LLIA of the ALS through a ground-shielded cable, the LTRI being connected to a cell demultiplexer for receiving serial data from the LLIA, converting the serial data received from the LLIA into a parallel data, generating an odd parity bit and transmitting the parallel data to the cell demultiplexer;

the cell demultiplexer receiving the cell from the LTRI, identifying a user cell and an IPC cell, transmitting one of the user cell to the FRIA or the IPC cell and the OAM cell to the IRFIFO;

an AAL5 reassembling unit having 128 Kbyte reassembling packet memories (RPM), and 128 Kbyte reassembling control memories (RCM) and connected to the cell demultiplexer for reassembling the cell stored in the IRFIFO in the form of the AAL5;

a third buffer for controlling a 16 bit data bus transmitted from the cell demultiplexer; and a clock receiver connected to the LTRI, the CBRC, the cell multiplexer and the FCDA interface for receiving a clock signal of an ECL level from the FCDA interface and transmitting the received clock to each of the LTRI, the CBRC and the cell multiplexer.

2. The apparatus of claim 1, wherein the CBRC comprises:

a first circuit for periodically checking cell transmission request signals transmitted from the 16 FRIA through the up stream cell bus, selecting a lower FRIA number when more than two FRIA request a cell transmission, counting a 23.4747 MHz clock, increasing the clock +1 at every 4 clock signals, selecting the cell transmission request signal corresponding with a corresponding coefficient value when the counted value is 0 through 15, generating a read enable signal to the FIFO of a corresponding FRIA when the cell transmission request is recognized, reading a 56 octet by synchronizing the data having a uniform cell format to an up stream cell bus clock of 11.73735 MHz and storing into the internal register of the CBRC;

a second circuit having an internal register so that the processor performs a connection identifier registration and deletion request from the CCCP and obtaining a connection identifier within 600 nano seconds based on the hardware logic without using the processor for a user cell inputted through the up stream cell flow interface;

a third circuit for inputting an FRIA number, a link number, a subscriber number and a DLCI into the control register when the processor registers a connection identifier, registering a command bit as "1", verifying a command result bit when the state register bit is "0" and performing an enquiry for managing the connection identifier registered in the CAM when the command result is "OK";

a CAM control circuit counting 23.4747 MHz clock for obtaining a connection identifier with respect to the user cell inputted from the up stream cell flow interface, generating a control signal such as a CAM writing enable signal, CAM chip enable signal, and a CAM command/data signal in accordance with the counted value, accessing 16 bit data bus, enquiring the connection identifier with respect to the head variable of 20 bits and checking a match flag outputted from the CAM;

a fourth circuit for converting the cell to a cell type that the UPC requests for checking the user traffic using the connection identifier; and a fifth circuit for storing the cell converted into the cell type into the UPC FIFO.

3. The apparatus of claim 1, wherein said user parameter controller includes a circuit for checking whether the traffic parameter is used by accessing the cell stored in the UPC FIFO using a UTOPIA interface, tagging the cell as a violated cell if a cell discarding rate (CLP) of the cell equals 1 or discarding the cell if the CLP equals 0, counting the entire cell, storing the counted cells into the UPC memories, respectively, and storing the cell which is used for a traffic parameter in the UFIFO.

4. The apparatus of claim 1, wherein said cell multiplexer comprises:

a module clock signal counting circuit for counting 23.4747 MHz inputted from the clock receiver within a range of 0 to 63, providing the generation time of the cell synchronous signal which is a cell start signal and an information on whether the cell is stored into the UFIFO and the ITFIFO, respectively, 8 bytes adding time which is an ATM link control field, a time in which the EHEC byte is inserted into the 8th byte field of the cell head, and a data transmission time;

an EHEC generation circuit for generating an EHEC byte of $X^8+X^2+X+1$ with respect to the head 7 bytes stored in the data register;

a circuit for extracting a routing information and an outgoing virtual path identifier/virtual channel identifier (VPI/VCI) stored in a corresponding address of the head conversion table with reference to the connection identifier from the head of the cell outputted from the UFIFO and ITFIFO, synchronizing the system internal cell formed in an inter mobile inferface (IMI) form to the module clock signal and transmitting the cell to the LTRI; and a processor interface circuit in which the processor stored the data of the head conversion table transmitted from the CCCP into the DPRAM for enabling the processor to read the stored data.

5. The apparatus of claim 1, wherein said cell demultiplexor comprises:

a receiving clock counting circuit for initializing the receiving clock signal counting value when the cell synchronous signal from the LTRI is a low level, increasing the clock counting by "1" whenever the receiving clock is transited to a high level and providing a range from 0 to 63;

a circuit for identifying the user cell and IPC cell with reference to a cell type (CET) bit in the switching system internal cell received from the LTRI, checking the bit of the head payload type ID (PTI) field of the cell with respect to the user cell, removing a 3 byte routing information and an 8 byte ATM link control field since the value is 100 or 101, and when the cell is the OAM cell, computing an HEC with respect to the head 4 byte, and storing the OAM cell of 53 bytes into the IRFIFO by inserting into the HEC field;

a circuit for storing the cell into the IRFIFO through the same procedure as the OAM cell when the cell is the IPC cell;

a circuit for converting the 8 bit bus data into 16 bit bus data when the user cell is transmitted to the FRIA through the down stream cell flow bus where the cell is the user cell, transmitting the user cell of 28 words by removing 8 bytes which is the ATM link control field and additionally transmitting the bit map consisting of 16 bits which designates whether the user cell corresponds with one among the FRIA0 through FRIA15 to the first position of the user cell; and an odd number parity checking circuit for generating an odd number parity bit at every clock signal with respect to the system internal cell, determining whether the generated bit is the same as the odd number parity bit inputted from the LTRI and informing the processor of the result if a parity error is determined.

* * * * *